July 7, 1959 A. MAXIM 2,893,739
SPINDLE FOR AUTOMATIC PHONOGRAPH RECORD CHANGER
Filed March 20, 1956 2 Sheets-Sheet 1

INVENTOR.
Andrew Maxim
BY
Merchant & Merchant
ATTORNEYS

July 7, 1959 A. MAXIM 2,893,739

SPINDLE FOR AUTOMATIC PHONOGRAPH RECORD CHANGER

Filed March 20, 1956

2 Sheets-Sheet 2

INVENTOR.
Andrew Maxim
BY
Merchant & Merchant
ATTORNEYS

United States Patent Office 2,893,739
Patented July 7, 1959

2,893,739

SPINDLE FOR AUTOMATIC PHONOGRAPH RECORD CHANGER

Andrew Maxim, Cleveland, Ohio, assignor, by direct and mesne assignments, to Imperial Manufacturing Corporation, a corporation of Massachusetts Application March 20, 1956, Serial No. 572,651
9 Claims. (Cl. 274—10)

My invention relates generally to automatic phonograph record players and more particularly to record supporting and changing spindle structures for use in such record players.

More specifically, my invention relates to improvements in record changing apparatus in drop type record supporting and changing spindles of the large diameter variety commonly used at the present time in connection with records adapted to rotate at substantially 45 r.p.m. and having a central aperture considerably larger than those of previously manufactured types.

Heretofore, record supporting and changing spindles of the large diameter type have employed two or more primary shelves or shoulders adapted to be moved outwardly through openings in the spindle to support the lowermost record in a stack thereof on said spindle, and inwardly to release said lowermost record and permit the same to drop to the turntable for subsequent engagement with the stylus of a transducer for playing the record. These spindles have also employed knife-like secondary record separating and supporting elements moving outwardly to engage inner edge portions defined by the central aperture of the next to lowermost record, to support the stack thereof while the lowermost record was dropped to the turntable. After release of the lowermost record, the primary shelves or shoulders were moved outwardly and the secondary elements moved inwardly to permit the stack of records to drop onto said shelves.

Several types of mechanisms utilizing the above elements for changing records have been produced with varying degrees of success. In these mechanisms, the knife-like secondary separating and supporting elements have been positively moved toward their operative record engaging positions and toward their inwardly directed inoperative positions. Due to the fact that, after playing, it is desired to remove the records from the turntable, it has been the practice to yieldingly bias the so-called "shelves" or primary record supporting elements toward their operative positions so that, when the secondary elements are retracted, the records, upon being lifted from the turntable, will move the primary elements inwardly against bias of the yielding means, and move upwardly beyond the supporting elements and off from the spindle.

The practice of positively moving the above-mentioned secondary elements toward operative engagement with the under surfaces of the records at their inner peripheral portions has met with substantial success when utilizing relatively new records of uniform thickness. However, records manufactured by different companies vary in thickness and, due to careless handling and other causes, often warp to the extent that the over-all thickness thereof is materially affected. When this occurs, the knife-like secondary elements, instead of passing between the lowermost record and the overlying next to lowermost record, cut into the inner peripheral portion of one or the other thereof, and either stalls the changing mechanism or causes the record to be chipped or otherwise damaged at its inner peripheral portion. Repeated chipping of a record at this portion thereof soon renders the record unfit for use in an automatic record changer and, when the changer is used in a commercial coin operated phonograph or the like, creates a highly unsatisfactory operation.

The primary object of my invention is the provision of a record changing spindle structure of the drop type which will automatically change records irrespective of differences in thickness thereof or the warped condition thereof, and without damage to the records. To this end I provide a spindle structure having primary record supporting shelf elements that are yieldingly biased toward an outwardly disposed record supporting position and positively moved toward their inoperative record releasing positions. I further provide a plurality of secondary record separating and supporting elements which, like the primary elements, are yieldingly biased toward operative record supporting positions, and positively moved toward their inoperative record releasing positions. The yielding bias applied to the secondary record supporting elements is sufficient to cause the same to properly support a stack of records, even when the record engaging portions thereof engage the inner peripheral surface of the next to lowermost record as well as when said record engaging portions move into overlying supporting relationship with said next to lowermost record, the yielding bias exerted upon said secondary elements being insufficient to cause the secondary elements to chip or otherwise damage the record engaged thereby.

Another highly important object of my invention is the provision of a record changing spindle structure in which records may be quickly and easily changed whether the turntable and spindle are under rotation or stationary, operation of the record changing mechanism within the spindle not being dependent upon rotation thereof.

Another object of my invention is the provision of an automatic record changing spindle structure which may be quickly and easily taken apart for servicing or adjustment, and as quickly and easily reassembled for use.

Still another object of my invention is the provision of a spindle structure as set forth which is relatively simple and inexpensive to produce, which is highly efficient in operation, and which is rugged in construction and durable in use.

The above and still further highly important objects and advantages of my invention will become apparent from the following detailed specification, appended claims and attached drawings.

Referring to the drawings, which illustrate the invention, and in which like reference characters indicate like parts throughout the several views.

Figure 1:
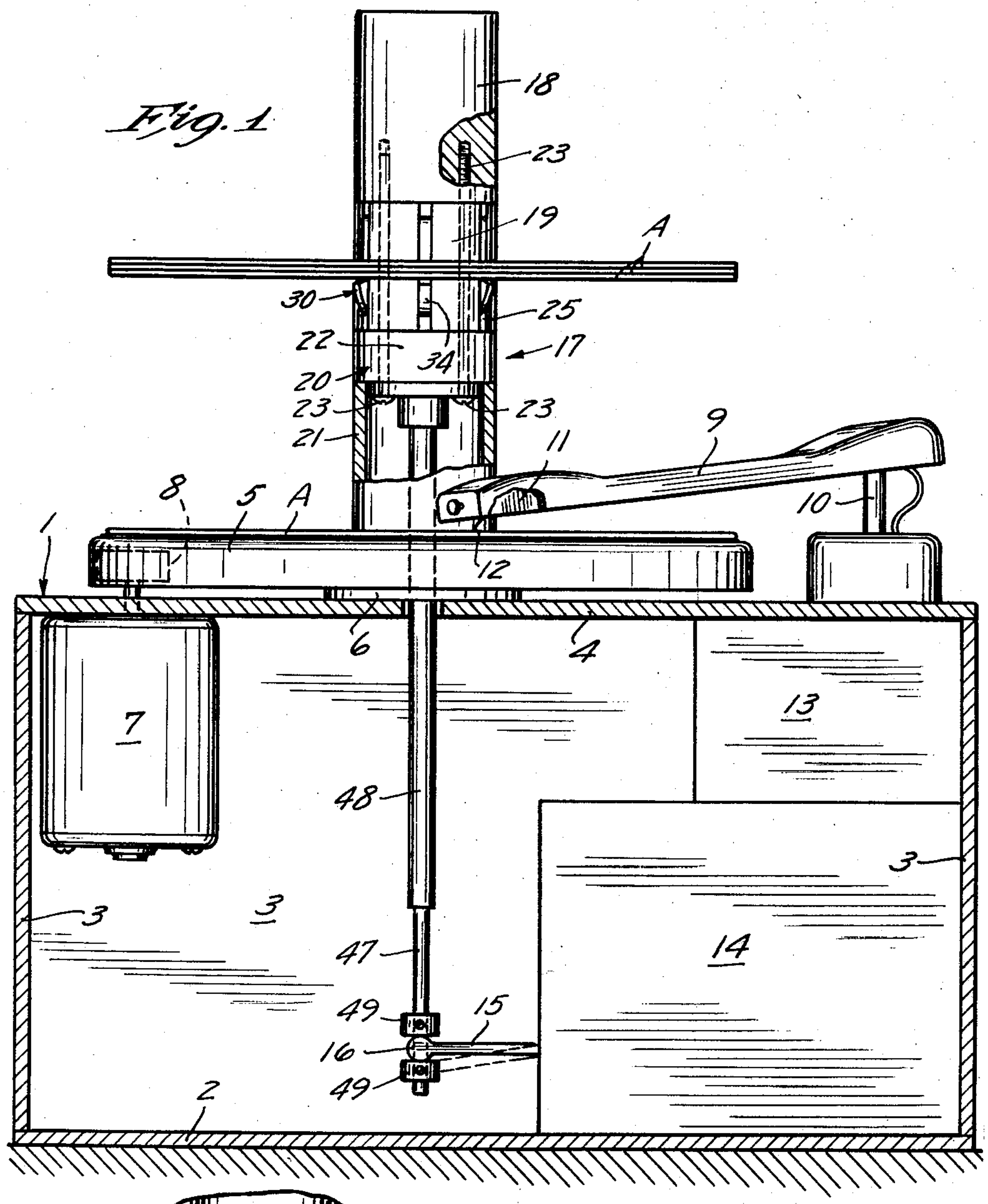
Fig. 1 is a view in side elevation of an automatic record player having my novel spindle structure mounted thereon, some parts being broken away and some parts shown in section.
Figure 7:
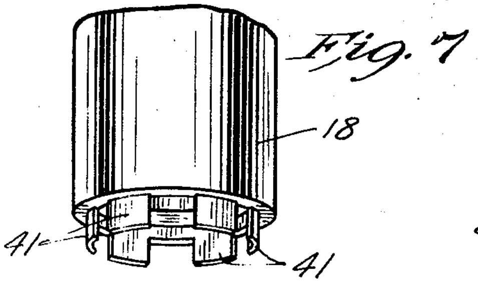
Fig. 7 is a fragmentary view in perspective of the uppermost spindle section of the spindle structure of my invention.

Referring with greater detail to the drawings, the numeral 1 indicates in its entirety a housing or cabinet comprising a bottom wall 2, side walls 3 and a top wall or mounting plate 4. Turntable 5 is journaled in a suitable bearing 6 mounted on the mounting plate 4 for rotation about a vertical axis, and is driven by a motor 7 contained within the housing 1 through suitable means such as a friction drive roller 8. A tone arm 9 is mounted on a conventional support therefor, indicated at 10, for swinging movements of its free end toward and away from the turntable 5, and at its free end, is provided with a conventional transducer 11 having a record engaging stylus 12 extending therefrom in a direction to engage a record disc A mounted on the turntable 5. Mechanism for automatically moving the tone arm into and out of playing engagement with the record A on the turntable may be assumed to be contained within the cabinet or housing 1 within box-like structures 13 and 14. If desired, the mechanism for operating the tone arm 9 may be driven from the motor 7 by suitable means not shown. Inasmuch as this mechanism may be any one of a number of such mechanisms in present-day use, and as this mechanism in itself does not comprise the instant invention, detailed showing and description thereof is not deemed necessary. Hence, for the sake of brevity, such detailed showing and description is omitted. It will be noted, however, that the mechanism within the boxes 13 and 14 includes an actuator 15 which terminates in a shifter fork or the like 16 disposed adjacent the axis of the turntable and movable upwardly and downwardly with respect thereto.

My novel record changing spindle structure extends axially upwardly from the central portion of the turntable 5 and is indicated in its entirety at 17. The spindle structure 17 comprises an upper spindle section 18, an intermediate spindle structure 19, and a lower spindle section 20, the latter of which includes a tubular member 21 extending upwardly from the turntable 5, and a collar 22 rigidly secured to the upper end of the tubular member 21. The tubular member 21 may if desired be formed as an integral part of the turntable 5, or welded or otherwise rigidly anchored thereto as desired. The several sections comprising the spindle structure 17 are of equal diameter, said diameter being only slightly less than that of the relatively large central aperture of the well-known 45 r.p.m. record discs in common use, whereby to permit free axial sliding movements of records A thereon. The collar 22 of the lower section 20, the intermediate spindle section 19 and the upper spindle section 18 are anchored together in axial alignment by a pair of anchoring screws 23 extending upwardly, suitable aligned apertures in the lower and intermediate spindle sections 20 and 19 respectively and screw threaded into the upper spindle section 18, see Figs. 1, 4 and 5.

The intermediate spindle section 19 is provided with an axial passage 24 and a plurality of circumferentially spaced radial slots 25 that extend axially the full length of the intermediate spindle section 19. The slots 25 open radially outwardly through the outer peripheral wall surface 26 of the spindle section 19, and are relatively shallow at their axially intermediate portions. Adjacent the upper and lower ends of the intermediate section 19, the slots 25 extend radially inwardly through the inner peripheral wall surface of the intermediate spindle section defined by the passage 24, whereby the slots 25 communicate with said passage at the opposite end portions of the intermediate spindle section. The spindle section 19 is further provided with an axially downwardly opening circumferentially extended channel 27 which intersects the lower end portions of the slots 25, and at its upper end with a similar axially upwardly opening circumferentially extended channel 28 which intersects the upper end portions of the slots 25. Seated in the lower circumferentially extended channel 27 is an annular shaft or mounting ring 29 which extends through suitable apertures in a plurality of primary record supporting bell crank elements 30. The primary bell crank elements 30 are one each carried in a different one of the slots 25, the ring or shaft passing through suitable apertures in the intermediate portions of the elements 30. Although any desired number of slots 25 and bell crank elements 30 may be utilized, for the purpose of the present example, six of each are shown, see particularly Figs. 4 and 5. Each of the bell crank elements 30 includes a generally upwardly extending arm 31 the upper end of which defines a record engaging shelf or shoulder 32, and a generally radially inwardly extending arm 33 the radially inner end of which extends into the axial passage 24 of the intermediate spindle section 19. The arm 31 of each bell crank element 30 has an outer cam acting surface 34, the purpose of which will hereinafter be described. The collar 22 of the lower spindle section 20 is provided with a plurality of axially upwardly extending segmental tongues 35 that are received within the circumferentially extended channel 27 between the lower end portions of the slots 25, and engage the annular shaft or ring 29 and hold the same seated in the bottom of the channel 27. The primary record supporting bell crank elements 30 are freely movable on the annular shaft 29 for pivotal movements between operative and inoperative positions as will hereinafter be described.

Figures 2, 3, 4, 5, 6:
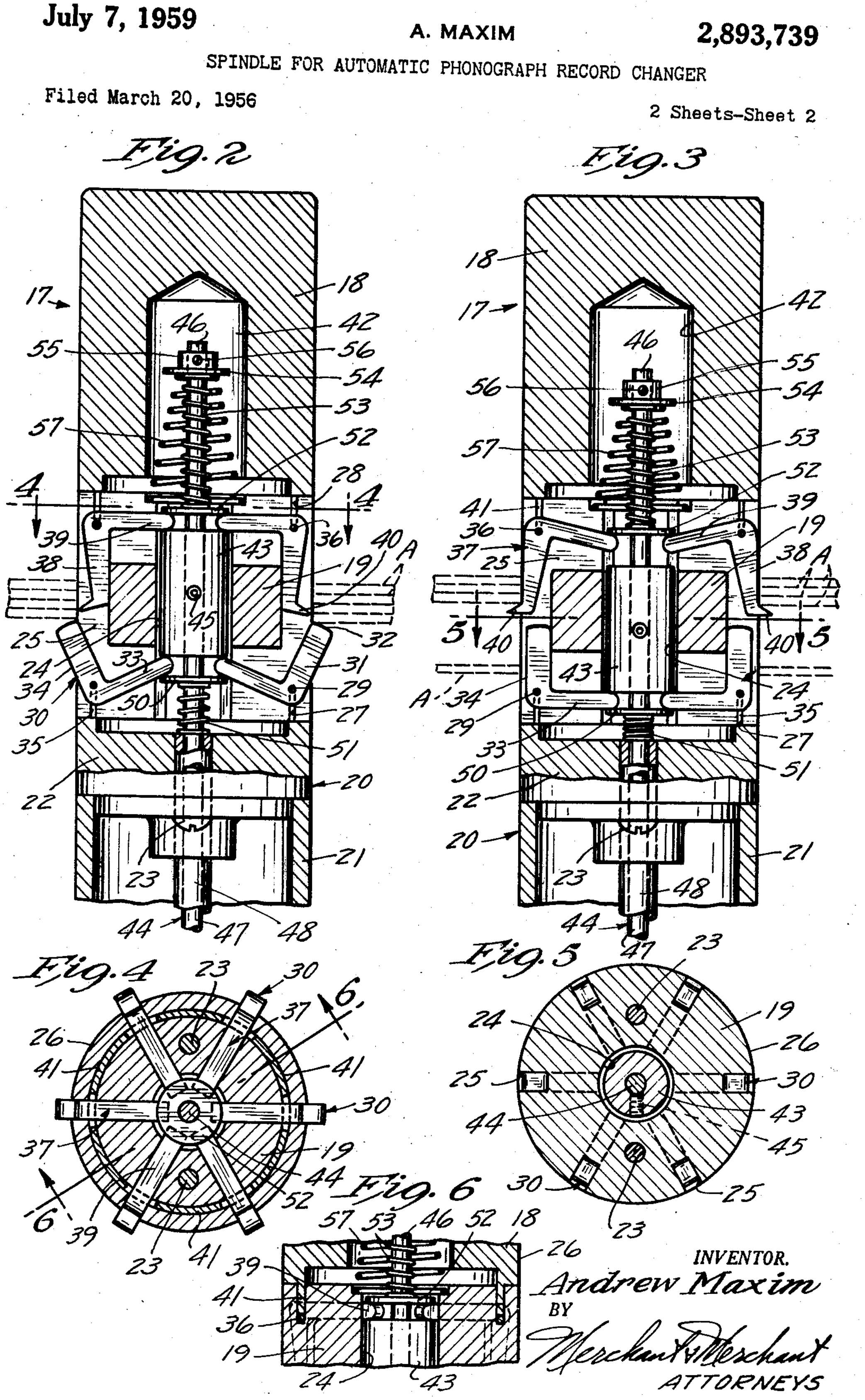
Fig. 2 is an enlarged fragmentary axial section of the spindle structure of my invention showing a stack of records being supported by the primary record supporting elements of my invention.
Fig. 3 is a view corresponding to Fig. 2 but showing a different position of some of the parts, one of the records being released to drop to the turntable, the others of said records being supported by the secondary supporting elements of my invention.
Fig. 4 is a transverse section taken on the line 4—4 of Fig. 2.
Fig. 5 is a transverse section taken substantially on the line 5—5 of Fig. 3.
Fig. 6 is a fragmentary detail in section taken on the line 6—6 of Fig. 4.

An annular shaft or mounting ring 36, similar to the ring 29, is seated at the bottom of the circumferentially extended channel 28, and carries a plurality, as shown 6, of secondary record separating and supporting bell crank elements 37, one each in a different one of the radial slots 25 adjacent the upper end thereof. The bell crank elements 37 are journaled for free swinging movements on the annular shaft or ring 36 at their intermediate portions, and each comprises a generally downwardly extending arm 38 and a generally radially inwardly projecting operating arm 39. The free radially inner ends of the arms 39 extend into the central passage 24 of the intermediate spindle section 19 in a manner similar to the free ends of the arms 33 of the primary bell crank elements 30. The lower free ends of the arms 38 are provided with outwardly extending relatively sharp edged record separating and supporting portions 40 that are adapted to move between the lowermost record A of a stack thereof normally supported by the shoulder forming ends 32 of the primary bell crank elements 30 and the next lowermost record A of said stack, upon swinging movements of the secondary bell crank elements 39 in one direction. As shown in Figs. 2 and 3, the record engaging portions 40 are adapted to engage and underlie the inner peripheral portions of the records A defined by the central apertures thereof. The upper spindle section 18, like the collar 22 of the lower spindle section 20, is provided with a plurality of segmental tongues 41 which extend axially downwardly into the circumferentially extended channel 28 between the upper ends of the slots 25 to hold the annular shaft or ring 36 seated in the bottom of the channel 28. The upper spindle section 18 is further provided with a downwardly opening axial recess 42 aligned with the axial passage 24 of the intermediate spindle section 19.

A cylindrical operating element or head 43 is mounted in the axial passage 24 for free axial sliding movements therein, between the radially inner free ends of the arms 33 which underlie the lower end thereof and the radially inner free ends of the arms 39 which overlie the upper end thereof. The head 43 comprises a portion of operating means for the primary and secondary bell crank elements 30 and 37 respectively, said operating means further including a reduced diameter shaft 44 extending axially through a central passage in the head 43 and anchored thereto for common axial movement therewith by a setscrew or the like 45. The upper end portion of the shaft 44 extends above the head 43 into the recess 42 of the upper spindle section 18, and is designated at 46. The lower portion of the reduced diameter shaft 44 is indicated at 47 and is axially slidably contained by a guide sleeve or the like 48 that is anchored in the collar 22 of the lower spindle section 20 and which extends downwardly into the interior of the cabinet or housing 1. With reference to Fig. 1 it will be seen that the lower end portion 47 of the shaft 44 extends downwardly beyond the lower end of the guide sleeve 48, and at its extreme lower end with a pair of axially spaced flanges or collars 49 for reception of the shifter fork portion 16 of the actuator 15, whereby movement is imparted to the shaft 44 and operating head 43 alternately in opposite directions axially of the spindle 17.

With reference to Figs. 2 and 3, it will be seen that the record engaging portions 40 of the secondary supporting bell crank elements 37 overlie the upper record engaging shoulders 32 of the bell crank arms 31 in closely spaced relationship, this spacing being substantially equal to the average thickness of the records A. Referring now to Fig. 3, it will be seen that downward movement of the operating head 43 causes the primary bell crank elements 30 to be positively moved toward their inoperative record releasing position radially inwardly with respect to the outer peripheral surface 26 of the intermediate spindle section. It will be noted that the inner free ends of the arms 33 of the primary bell crank elements 30 are interposed between the lower end of the operating head 43 and a washer 50 axially slidable on the shaft 44 below the head 43. A coil compression spring 51 is interposed between the collar 22 of the lower spindle section 20 and the washer 50 to yieldingly urge the primary bell crank elements 30 toward their operative record supporting positions of Figs. 1, 2 and 4, and that downward movement of the operating head 43 imparted thereto by the actuator 15 causes the bell crank elements 30 to be swung to their inoperative record releasing position of Fig. 3 against bias of the spring 51.

The free ends of the arms 39 of the secondary record separating and supporting bell crank elements 37 are interposed between the upper end of the operating head 43 and a washer 52 slidably mounted on the upper portion 46 of the shaft 44. A coil compression spring 53 is interposed between the washer 52 and an abutment in the nature of a second washer 54 slidably mounted on the upper shaft portion 46 adjacent its upper end and within the recess 42. A stop collar 55 limits upward movement of the washer 54, and is rigidly secured adjacent the extreme upper end of the shaft portion 46 by means of a setscrew or the like 56 whereby the collar 55 may be locked in desired set positions axially of said upper shaft portion 46. Adjustment of the collar 55 on the upper shaft portion 46 regulates the degree of yielding bias exerted by the spring 53 on the washer 52 and the arms 39 of the secondary bell crank elements 37. With this arrangement it will be seen that the secondary bell crank elements 37, like the primary bell crank elements 30, are yieldingly urged toward operative engagement with the records A, and positively moved toward their inoperative positions of Fig. 2 by movement of the operating head 43 in an upward direction with respect to the spindle structure. By means of the adjustable collar 55, yielding bias of the spring 53 may be controlled to a relatively fine degree. Thus, in the event that the record engaging portions or teeth 40 engage the inner peripheral surface of the next to lowermost record A in the stack, instead of entering between the lowermost record and the overlying next to lowermost one thereof, the relatively sharp edges of the record engaging portions 40 will engage said inner peripheral record surface with sufficient force to support the stack of records, but with insufficient force to chip or otherwise damage the engaged record. Obviously, when the abutment collar 55 is once properly adjusted, readjustment thereof is rarely necessary. Inasmuch as the stop collar 55 moves in common with the operating shaft 44, yielding bias is exerted against the inner ends of the arms 39 of the bell cranks 37 equally throughout the length of downward movement of the operating head 43 and shaft 44. This arrangement provides for ease of adjustment of the gripping force exerted by the record engaging portions 40 of the secondary bell crank elements 37 against the engaged record A inasmuch as the spring rate of the spring 53 remains substantially constant within the limits of movement of the operating head 43 and shaft 44.

For the purpose of maintaining the secondary bell crank elements 37 in their inoperative positions during idle periods of the machine, I provide a coil compression spring 57 that is interposed between the abutment washer 54 and the upper end of the intermediate spindle section 19 independently of the the spring 53. Assuming that the actuator 15 is free for movement during idle periods of the record player, the spring 57 lifts the operating shaft 44 and head 43 to their positions of Fig. 2 to move the secondary bell cranks 37 to their inoperative positions and permit the spring 51 to move the primary bell crank elements to their operative record supporting positions. With this arrangement, records on the turntable 5 may be manually lifted from the table and off from the spindle, the inner peripheral surfaces of the records engaging the outer cam acting surfaces 34 of the primary bell crank elements 30 to move the same inwardly to their inoperative positions against bias of the spring 51. Thus the records may be moved upwardly beyond the primary bell crank elements 30 and off of the spindle structure 17.

My invention has been thoroughly tested and found to be completely satisfactory for the accomplishment of the objectives set forth; and while I have shown and described a preferred embodiment of my novel spindle structure, it will be understood that the same is capable of modification without departure from the spirit and scope of the invention as defined in the claims.

What I claim is:

1. A record supporting and changing cylindrical spindle structure for an automatic phonograph record player having, a turntable, a pivotally mounted tone arm, a stylus equipped transducer carried thereby, a motor for imparting rotation to the turntable and positioning said tone arm, and an actuator for said spindle structure, said spindle structure extending axially upwardly from said turntable and having a diameter only slightly less than that of the central apertures in the records to be played to permit axial sliding movements of the records thereon, a plurality of circumferentially spaced primary record supporting elements mounted in said spindle structure in upwardly spaced relation to said turntable for common movements between operative positions wherein portions of said elements are disposed radially outwardly of the cylindrical surface of said spindle structure to engage bottom surface portions of a record on said spindle structure, and inoperative positions wherein said portions are disposed radially inwardly with respect to the operative positions thereof to permit downward axial movement of said record, a plurality of circumferentially spaced secondary record separating and supporting elements mounted in said spindle structure for common movements between operative positions wherein portions of said secondary elements are disposed radially outwardly of the cylindrical surface of said spindle structure to engage spaced portions of a record on said spindle structure, and inoperative positions wherein said portions of the secondary elements are disposed radially inwardly with respect to said operative positions thereof to release the record, said record engaging portions of the primary elements being downwardly spaced from the corresponding portions of said secondary elements a distance substantially equal to the thickness of the record to be played, whereby, when a plurality of records are stacked on said spindle structure, said portions of the primary elements are adapted to engage bottom surface portions of the lowermost record in the stack thereof, said portions of the secondary elements being adapted to engage the adjacent record of the stack overlying said lowermost one thereof to support said adjacent overlying record and the records thereabove when said primary elements are moved to their inoperative positions, yielding means urging said primary and secondary elements toward their operative record supporting positions, an operating element mounted in said spindle structure for movements in one direction to positively move said primary elements toward their inoperative positions and in the opposite direction to positively move said secondary elements toward their inoperative positions, both against bias of said yielding means, and means operatively coupling said operating element to said actuator to be moved thereby.

2. A record supporting and changing cylindrical spindle structure for an automatic phonograph record player having, a turntable, a pivotally mounted tone arm, a stylus equipped transducer carried by said tone arm, a motor for imparting rotation to the turntable and positioning said tone arm, and an actuator for said spindle structure, said spindle structure extending axially upwardly from said turntable and having a diameter only slightly less than that of the central apertures in the records to be played to permit axial sliding movement of the records thereon, a plurality of cooperating primary and secondary record supporting elements, means mounting said primary supporting elements in said spindle structure in upwardly spaced relation to said turntable for pivotal movements between operative positions wherein portions of said primary supporting elements are disposed radially outwardly of the cylindrical surface of said spindle structure to engage bottom surface portions of the lowermost record of a stack of one or more thereof on said spindle to support the same, and inoperative positions wherein said portions of the primary supporting elements are disposed radially inwardly of the inner edges defined by the central apertures of said records, yielding means urging the primary supporting elements toward their operative positions, means mounting said secondary supporting elements in said spindle structure in upwardly spaced relation to said primary elements for pivotal movements between operative positions wherein portions of said secondary elements are disposed radially outwardly of the cylindrical surface of said spindle structure to engage spaced portions of a record in the stack thereof, and inoperative positions wherein said portions of the secondary elements are disposed radially inwardly of said inner edges defined by the central apertures of the records, said record engaging portions of the primary elements being downwardly spaced from the corresponding portions of said secondary elements a distance substantially equal to the thickness of a record, whereby said portions of the secondary elements are positioned to engage the adjacent record of the stack overlying said lowermost one thereon to support said adjacent overlying record and the records thereabove, yielding means urging the secondary supporting elements toward their operative record supporting positions, an operating element mounted in said spindle structure for movements in one direction to positively move said primary supporting elements toward their inoperative positions against bias of the yielding means therefor, said operating element being movable in the opposite direction to positively move said secondary supporting elements toward their inoperative positions against bias of the yielding means therefor, and means operatively coupling said operating element to said actuator to be moved thereby.

3. The structure defined in claim 2 in which each of said mounting means for the record supporting elements comprises a horizontally disposed annular shaft seated in the spindle structure in concentric relation thereto, the record supporting elements being pivotally mounted thereon in circumferentially spaced relationship.

4. The structure defined in claim 2 in which each of said primary supporting elements comprises a primary bell crank having a generally radially inwardly extended operating arm and a generally axially upwardly extended record engaging arm, and in which each of said secondary supporting elements comprises a secondary bell crank having a generally radially inwardly extended operating arm and a generally axially downwardly extended record engaging arm, said operating element being disposed axially between the operating arms of said bell cranks and axially movable alternately in opposite directions to alternately engage the operating arms of said bell cranks, whereby movement of said operating element in one direction will positively move one of said bell cranks in a direction toward its inoperative position, the other of said bell cranks being moved to its operative record engaging position by its cooperating yielding means.

5. A record supporting and changing spindle structure for an automatic phonograph record player having, a turntable, a pivotally mounted tone arm, a stylus equipped transducer carried by said tone arm, a motor for imparting rotation to the turntable and positioning said tone arm, and an actuator for said spindle structure, said spindle structure comprising axially aligned upper, intermediate and lower cylindrical spindle sections rigidly secured together and to said turntable, said spindle structure extending axially upwardly from said turntable and having a diameter only slightly less than that of the central apertures in the records to be played to permit axial sliding movement of the records thereon, a plurality of circumferentially spaced primary record supporting elements mounted in said intermediate spindle section for common movements between operative and inoperative positions, a plurality of circumferentially spaced secondary record supporting elements mounted in said intermediate section above said primary elements for common movements between operative and inoperative positions, said primary and secondary elements each having portions positioned radially outwardly of the cylindrical surface of said intermediate spindle section and engaging the inner edges defined by the central apertures of said records to support one or more of said records in a stack on said spindle structure when the supporting elements are moved to their operative positions and radially inwardly spaced therefrom when said elements are moved to their inoperative positions, the record engaging portions of said primary elements being downwardly spaced from the record engaging portions of said secondary elements a distance substantially equal to the thickness of a single record, yielding means urging said supporting elements toward their operative record engaging positions, an operating element mounted in said intermediate spindle section for movements in one direction to positively move said primary supporting elements toward their inoperative positions against bias of said yielding means and permitting movement of the secondary supporting elements toward their operative record engaging positions, said operating element being movable in the opposite direction to move said secondary supporting elements toward their inoperative positions against bias of said yielding means and permitting movement of said primary elements toward their operative record engaging positions, and means operatively coupling said operating element to said actuator to be moved thereby alternately in opposite directions 6. A record supporting and changing spindle structure for an automatic phonograph record player having, a turntable, a pivotally mounted tone arm, a stylus equipped transducer carried by said tone arm, a motor for imparting rotation to the turntable and positioning said tone arm, and an actuator for said spindle structure, said spindle structure comprising axially aligned upper, intermediate and lower cylindrical spindle sections rigidly secured together and to said turntable, said spindle structure extending axially upwardly from said turntable and having a diameter only slightly less than that of the central apertures in the records to be played to permit axial sliding movement of the records thereon, said intermediate spindle section having an axial passage therethrough and a plurality of circumferentially spaced radial slots opening through the cylindrical surfaces of said intermediate section and communicating at their opposite end portions with said axial passage, a plurality of primary and secondary record supporting elements, means pivotally mounting said primary elements one each in a different one of said slots adjacent the lower ends thereof, means pivotally mounting said secondary elements one each in a different one of said slots adjacent the upper ends thereof, each of said elements having record engaging portions movable outwardly beyond the cylindrical surface of said intermediate spindle section toward operative supporting engagement with the inner edges defined by the central apertures of said records to support one or more of said records in a stack on said spindle structure, and inwardly toward inoperative positions radially inwardly spaced therefrom, said record engaging portions of said primary elements being downwardly spaced from the record engaging portions of said secondary elements a distance substantially equal to the thickness of a single one of said records, yielding means urging said supporting elements toward their operative record engaging positions, operating means mounted in said spindle structure and including a head axially movable in said axial passage, said primary and secondary record supporting elements having portions lying in the path of movement and engaged by the lower and upper ends respectively of said head upon movements thereof in opposite directions to be positively moved thereby toward their inoperative positions against bias of said yielding means, said operating means further including a reduced diameter shaft extending downwardly from said head for common movements therewith, the lower end of said shaft being adapted to be operatively coupled to said actuator.

7. The structure defined in claim 6 in which said intermediate spindle section defines a pair of circumferentially extended channels, one each opening axially outwardly of a different end of said spindle section, said record supporting element mounting means comprising a pair of annular shafts each extending through mounting apertures in their respective record supporting elements and each seated in a different one of said channels.

8. The structure defined in claim 7 in which said upper and lower spindle sections include axially extending segmental tongues received in adjacent ones of said channels in the intermediate spindle section between adjacent ends of said radial slots therein, the outer ends of said tongues engaging said annular shafts between the record supporting elements thereon to retain said annular shafts in the bottoms of their respective channels.

9. The structure defined in claim 6 in which said operating means further includes a reduced diameter shaft portion extending upwardly from said head within said upper spindle element and having an abutment at its upper end, said yielding means comprising, a compression spring interposed between the upper end of said lower spindle section and the head engaged portions of said primary record supporting elements and a second compression spring interposed between said abutment and the operating head engaging portions of said secondary supporting elements, and in further combination with a counter-balancing spring interposed between the upper end of said intermediate spindle section and said abutment independently of said second spring, said counter-balancing spring urging said head in a direction to move said secondary record supporting elements toward their inoperative position, whereby to permit free sliding movements of records upwardly past the record engaging portions thereof, said primary record supporting elements having outer cam acting portions engaged by said records during upward movement thereof to cause said primary elements to be moved by said records to their inoperative positions independently of said operating element.

References Cited in the file of this patent

UNITED STATES PATENTS

| | | |
|---|---|---|
| 2,579,175 | Dale | Dec. 18, 1951 |
| 2,604,325 | Hansen | July 22, 1952 |